US006108779A

United States Patent [19]
Dean et al.

[11] Patent Number: 6,108,779
[45] Date of Patent: Aug. 22, 2000

[54] SERVER AND COMPUTER NETWORK THAT PERMIT A CLIENT TO BE EASILY INTRODUCED INTO THE COMPUTER NETWORK

[75] Inventors: Jeffrey Randell Dean; Ingrid Milagros Rodriguez, both of Austin, Tex.

[73] Assignee: International Business Machines Corporation, Armonk, N.Y.

[21] Appl. No.: 09/118,292

[22] Filed: Jul. 17, 1998

[51] Int. Cl.[7] .......................... G06F 15/177; G06F 11/30
[52] U.S. Cl. .................................. 713/2; 713/201
[58] Field of Search .................... 713/1, 2, 200, 713/201, 100; 710/18, 34

[56] References Cited

U.S. PATENT DOCUMENTS

| | | | |
|---|---|---|---|
| 5,555,416 | 9/1996 | Owens | 713/2 |
| 5,867,646 | 2/1999 | Benson | 713/200 |
| 5,889,958 | 3/1999 | Willens | 713/201 |
| 5,892,903 | 4/1999 | Klaus | 713/201 |
| 5,968,116 | 10/1999 | Day | 709/202 |

Primary Examiner—Joseph E. Palys
Assistant Examiner—Willie Martin
Attorney, Agent, or Firm—Richard A. Henkler; Felsman, Bradley, Vaden, Gunter & Dillon, LLP

[57] ABSTRACT

A computer network includes a plurality of clients coupled to a server. The server includes data storage that stores network administration software and a shared client operating system. In response to detection of a new client attached to the computer network that has not previously been attached, the network administration software boots the shared client operating system on the new client. In one embodiment, the network administration software boots the shared client operating system on the new client in response to obtaining user logon information, where the user logon information is the only user input required for the network administration software to boot the shared client operating system on the new client.

12 Claims, 4 Drawing Sheets

SERVER AND COMPUTER NETWORK THAT PERMIT A CLIENT TO BE EASILY INTRODUCED INTO THE COMPUTER NETWORK

CROSS-REFERENCE TO RELATED APPLICATIONS

The present patent application is related to Ser. No. 09/118,209, entitled "METHOD AND APPARATUS FOR ALLOWING A USER TO ROVE AMONG VARIOUS CLIENTS IN A NETWORK WHILE MAINTAINING INDIVIDUAL HARDWARE AND SOFTWARE PREFERENCES" (Attorney Docket No. AT9-98-259) which is hereby incorporated by reference herein.

In addition, the following applications are also related to the present invention:

The present patent application is related to Ser. No. 09/118211, entitled "SIMPLIFIED SETTING UP OF A NETWORK OF A SERVER COMPUTER PRELOADED WITH ALL COMPUTER PROGRAMS REQUIRED BY A GROUP OF CLIENT COMPUTERS TO BE CONNECTED INTO NETWORK" (Attorney Docket No. AT9-98-228).

The present patent application is related to Ser. No. 09/118559, entitled "SYSTEM AND METHOD FOR CREATION OF A NETWORK COMPUTING ENVIRONMENT" (Attorney Docket No. AT9-98-230).

The present patent application is related to Ser. No. 09/118208, entitled "CONFIGURING COMPUTER NETWORK OPERATIONS BASED UPON THE CORRELATION OF A SEQUENCE OF INTERACTIVE DISPLAY USER ENTRIES APPARENTLY UNRELATED TO COMPUTER OPERATIONS" (Attorney Docket No. AT9-98-239).

The present patent application is related to Ser. No. 09/118557, entitled "DATA PROCESSING SYSTEM, METHOD, AND PROGRAM PRODUCT FOR AUTOMATING ACCOUNT CREATION IN A NETWORK" (Attorney Docket No. AT9-98-258).

The present patent application is related to Ser. No. 09/118293, entitled "COMPUTER SOFTWARE SYSTEM FOR ELIMINATING OPERATING SYSTEM MULTIPLE LOGINS UNDER REMOTE PROGRAM LOAD WITH NETWORK PROVIDER DYNAMIC LINK LIBRARY" (Attorney Docket No. AT9-98-229).

The present patent application is related to Ser. No. 09/118210, entitled "CONFIGURING COMPUTER NETWORK OPERATIONS BASED UPON A SEQUENCE OF INTERACTIVE USER ENTRIES INTO A NETWORK SERVER COMPUTER WITH A ONE TIME ENTRY OF DATA COMMONLY REQUIRED BY MULTIPLE CLIENTS" (Attorney Docket No. AT9-98-244).

The present patent application is related to Ser. No. 09/118560, entitled "NETWORK WITH STORAGE OF ALL CLIENT COMPUTER PROGRAMS IN SERVER COMPUTER HAVING CUSTOMIZED CLIENT GRAPHICAL USER INTERFACES WITH MAXIMUM SHARING OF STORED PORTIONS OF INTERFACES COMMON TO A PLURALITY OF CLIENTS" (Attorney Docket No. AT9-98-231).

The present patent application is related to Ser. No. 09/118292, entitled "SERVER AND COMPUTER NETWORK THAT PERMIT A CLIENT TO BE EASILY INTRODUCED INTO THE COMPUTER NETWORK" (Attorney Docket No. AT9-98-257).

The present patent application is related to Ser. No. 09/118207, entitled "METHOD AND APPARATUS FOR CREATING A PRELOAD IMAGE" (Attorney Docket No. AT9-98-261).

The present patent application is related to Ser. No. 09/118558, entitled "METHOD AND APPARATUS FOR ALLOWING A USER TO ROVE AMONG VARIOUS CLIENTS IN A NETWORK WHILE MAINTAINING INDIVIDUAL HARDWARE PREFERENCES" (Attorney Docket No. AT9-98-256).

The present patent application is related to Ser. No. 09/118555, entitled "AUTOMATIC CLEANUP OF USER DATA IN A NETWORK ENVIRONMENT" (Attorney Docket No. AT9-98-285).

The present patent application is related to Ser. No. 09/118556, entitled "METHOD AND APPARATUS FOR DETECTING AND INITIALIZING THE ADDITION OF A NEW CLIENT MACHINE IN A NETWORK" (Attorney Docket No. AT9-98-255).

BACKGROUND OF THE INVENTION

1. Technical Field

The present invention relates in general to data processing and, in particular, to data processing in a network environment. Still more particularly, the present invention relates to a method and apparatus that permit a client to be easily introduced into a computer network.

2. Description of the Related Art

A conventional local area network (LAN) may include a number of clients connected to a server via a selected network topology. In the past, each client computer in such a conventional LAN would execute operating system and application software resident within its own non-volatile storage. Because each client computer typically had only one, or at most a few users, the application programs that were available and the user preferences governing the configuration of the operating system and application software could be individually customized on each client computer. Unfortunately, in the event of a hardware failure of a client computer's non-volatile storage device, the user of the client computer lost all of their operating and application software as well as their user preferences. Thus, recovery from such a failure would entail replacing the failed computer, performing a time-consuming reload of all operating system and application software (typically from floppy disks or CD-ROMs), and finally reestablishing the user preferences.

With the proliferation of network licenses for application software, it has become more common to install application software on the LAN server. Storage of the application software on the LAN server permits a user to download a copy of an application stored on the server to a client computer's non-volatile storage and then establish his or her own user preferences for the application. As before, these user preferences are stored in the non-volatile storage of the client computer. In this type of network environment, the hardware failure of a client computer is a less disruptive event since the application programs may be easily downloaded from the server once the faulty computer is replaced and the client operating system is loaded onto the replacement computer. However, the user must still reestablish his or her user preferences, which can be a frustrating and time consuming task.

In view of the foregoing, it would be useful and desirable to provide a client computer that can be easily introduced into a network, either initially or as a replacement of a failed client computer, so that a user is permitted to begin productive computing with a minimal amount of effort.

SUMMARY OF THE INVENTION

In accordance with the present invention, a computer network includes a plurality of clients coupled to a server.

The server includes data storage that stores network administration software and a shared client operating system. In response to detection of a new client attached to the computer network that has not previously been attached, the network administration software boots the shared client operating system on the new client. In one embodiment, the network administration software boots the shared client operating system on the new client in response to obtaining user logon information, where the user logon information is the only user input required for the network administration software to boot the shared client operating system on the new client.

All objects, features, and advantages of the present invention will become apparent from the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
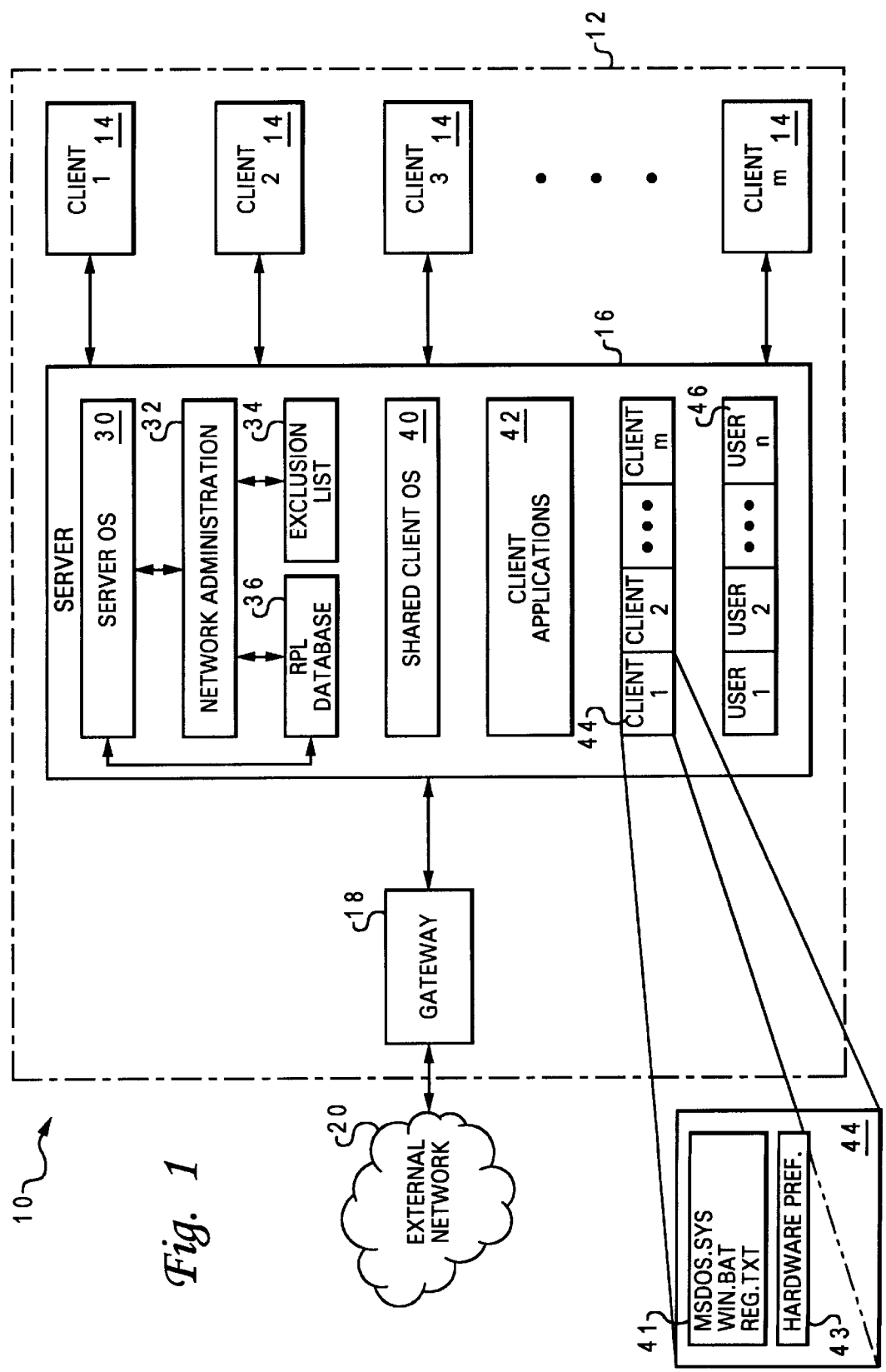
FIG. 1 depicts an illustrative embodiment of a computer network environment with which the method and system of the present invention may advantageously be utilized.

With reference now to the figures and in particular with reference to FIG. 1, there is depicted an illustrative embodiment of a network environment in which the present invention may advantageously be utilized. As illustrated, network environment 10 includes a local area network (LAN) 12 having M clients 14 and a gateway 18 that are coupled to a server 16 by a selected network topology. LAN 12 is coupled to an external network 20, which may comprise the Internet or World Wide Web, via gateway 18. Thus, gateway 18 serves as a bridge for communication between LAN 12 and external network 20.

Server 16 may be implemented with any of a number of conventional computer systems, such as the RS/6000 computer system manufactured by International Business Machines Corporation of Armonk, N.Y. Server 16 includes both data storage for storing software and other data and execution resources for executing software. As shown, non-volatile storage in server 16 stores network administration software 32 and a server operating system (OS) 30, such as the Windows NT operating system produced by Microsoft Corporation of Redmond, Wash. As is well-known to those skilled in the art, server operating system 30 provides a background operating environment that controls the allocation and usage of the hardware resources of server 16 by software such as network administration software 32. Network administration software 32 controls access to LAN 10 and its resources by clients 14 and provides resources to clients 14. Network administration software 32 may include, for example, modules that perform user authentication and user account management, establish print servers, etc. As illustrated, network administration software 32 maintains an exclusion list 34 that lists names of clients 14 that have been or are currently connected to LAN 12. Each client name is stored in association with an indication of whether or not the client name is associated with a client 14 currently attached to LAN 12. In addition, network administration software 32 updates a remote program load (RPL) database 36 established by server OS 30 that associates LAN interface adapter IDs with client names.

Network administration software 32 also establishes a client directory 44 for each of the M possible clients 14 that may be attached to LAN 12 and a user directory 46 for each of the N users of LAN 12. As illustrated in the exploded view, each client directory 44 contains a subboot directory 41 including the files MSDOS.SYS, WIN.BAT, and REG.TXT, which are discussed below. Client directory 44 further includes hardware preferences 43 for the associated client computer 14. Hardware preferences 43 may include, for example, a default keyboard character set (e.g., English, French, Japanese, etc.), display defaults, and/or audio presentation defaults. User directories 46, on the other hand, each contain information related to an associated user. In accordance with the present invention, user directories 46 each preferably contain software preferences that specify the associated user's desired desktop layout, default word processing settings, etc. By storing hardware preferences 43 and the users' software preferences separately on server 16, users are advantageously permitted to roam between clients 14 while retaining their own software preferences, as described in the related co-pending application incorporated by reference above.

Non-volatile storage in server 16 also stores a shared client OS 40, which in one preferred embodiment comprises the Windows 95 operating system produced by Microsoft Corporation, and client applications 42, which may include word processing, drawing, database, or other applications. Thus, in contrast to many prior art LAN environments, server 16 stores both operating system and application software that may be accessed and run by any of clients 14. Because shared client OS 40, client applications 42, hardware preferences 43 and a user's software preferences are all stored in non-volatile storage within server 16, a client 14 can easily be introduced into LAN 12, as discussed in detail below with respect to FIG. 3.

Figure 2:
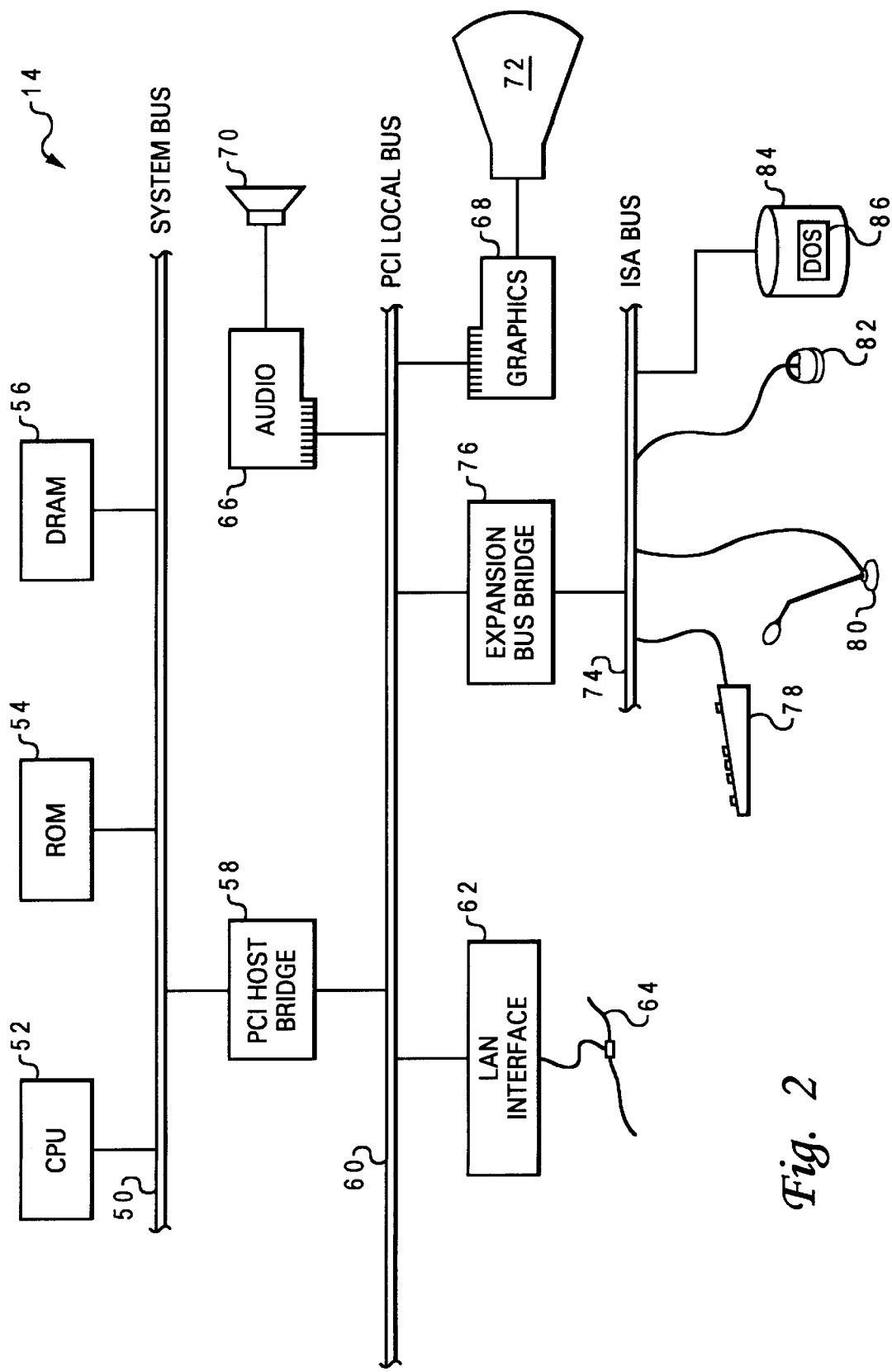
FIG. 2 illustrates an exemplary embodiment of a client computer in the computer network shown in FIG. 1.

Referring now to FIG. 2, there is illustrated an exemplary embodiment of a client 14 implemented as a multimedia personal computer system. As shown, client 14 has a system bus 50 connected to a central processing unit (CPU) 52, which executes software instructions and controls the operation of client 14, and read-only memory (ROM) 54 and dynamic random access memory (DRAM) 56, which provide storage for data and instructions that may be accessed by CPU 52. System bus 50 is coupled to PCI local bus 50 via Peripheral Component Interconnect (PCI) host bridge 58. PCI host bridge 58 provides both a low latency path through which CPU 52 may directly access PCI devices mapped to bus memory and/or I/O address spaces and a high bandwidth path through which PCI devices may directly access DRAM 56.

The PCI devices connected to PCI local bus 60 include a Local Area Network (LAN) interface adapter 62, which handles network communication between client 14 and a communications link 64 forming a portion of LAN 12. LAN interface adapter 62 identifies client 14 to server 16 via an adapter ID that is unique in LAN 12. In order to present audio and video data to a user, client 14 is further equipped with a PCI-compatible audio controller 66 and graphics controller 68, which drive stereo speakers 70 and video display 72, respectively.

PCI bus 60 is further coupled to an expansion bus, such as ISA bus 74, via expansion bus bridge 76. Coupled to ISA bus 74 are a number of conventional input devices, such as keyboard 78, microphone 80 and mouse 82, as well as other peripherals, such as IDE hard disk 84. As shown, hard disk 84 preferably stores a cold boot OS 86, such as the well-known DOS operating system, that client 14 will begin to execute at power-on.

Figure 3:
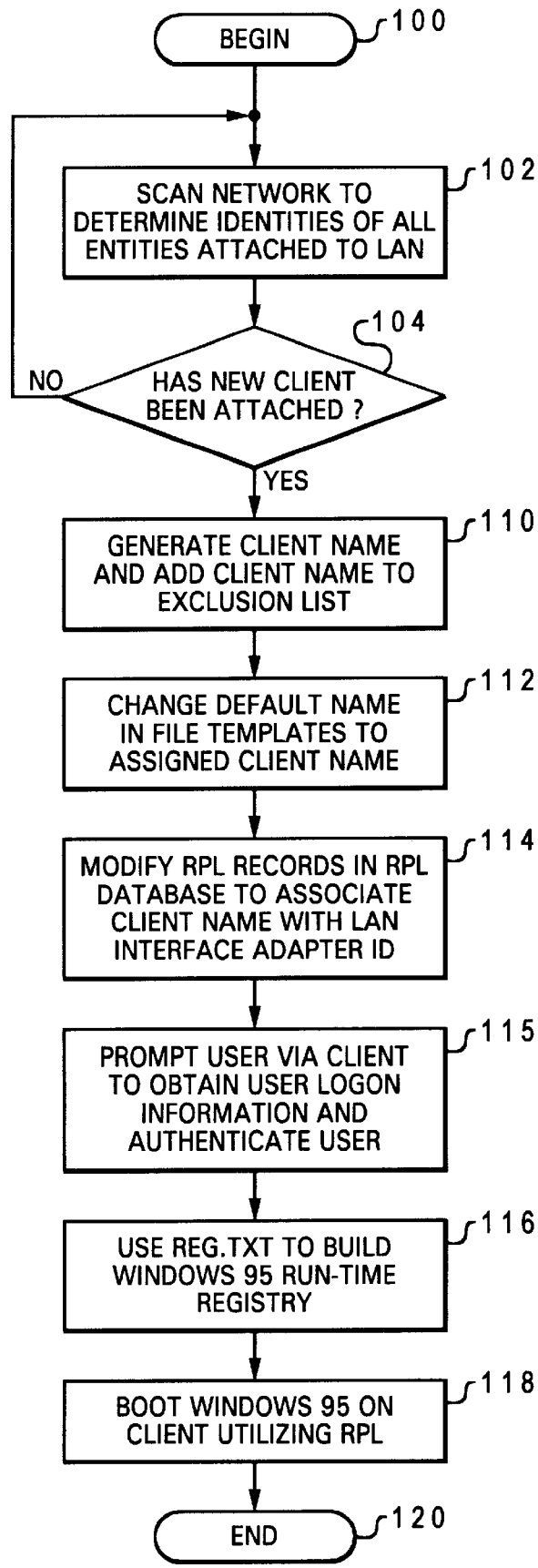
FIG. 3 depicts a high level logical flowchart of an illustrative embodiment of a method for introducing a client into a computer network from the perspective of the server.

With reference now to FIG. 3, there is illustrated a high level logical flowchart of an exemplary embodiment of a method for introducing a client 14 into LAN 16 from the perspective of network administration software 32 running on server 16. As illustrated, the process begins at block 100 and then proceeds to block 102, which depicts network administration software 32 scanning LAN 12 to determine the identity of all entities attached to LAN 12. The scan illustrated at block 102 provides the names and/or IDs of gateway 18, clients 14 and possibly other entities present within LAN 12. A determination is then made at block 104 on the basis of the received names and/or IDs whether a new client 14 has been attached to LAN 12. If so, the process proceeds from block 104 to block 110, which is described below. However, in response to a determination that a new client 14 has not been attached to LAN 12, the process returns to block 102, which illustrates network administration software 32 again scanning LAN 12, preferably after an interval of 60 or 120 seconds depending upon network activity.

Referring now to block 110, in response to a determination that a new client 14 has been attached to LAN 12, network administration software 32 generates a client name for the new client 14 (preferably utilizing an algorithm that can generate at most M client names), adds the client name to exclusion list 34, and sets the associated indication to signify that the client name is currently in use. Next, network administration software 32 accesses the preexisting client directory 44 associated with the newly generated client name. As illustrated in FIG. 1, client directory 41 contains templates of files MSDOS.SYS, WIN.BAT, and REG.TXT, which include all relevant lines of code but list a default client name in lieu of an actual client name. Utilizing the client name generated at block 110, network administration software 32 updates the default client name in the file templates to reflect the actual client name (e.g., XXAGLEXX), as depicted at block 112. Following block 112, the three files in the new client's subboot directory 41 on server 16 appear as follows:

MSDOS.SYS

[Paths]
WinDir=g:\XXAGLEXX
WinBootDir=C:\
HostWinBootDrv=C
[Options]
BootMulti=1
BootGUI=1
Network=1
LoadTop=0
WIN.BAT @Echo off
Set comspec=d:\winboot\command.com
Nwrpltrm
Fixmcm
Snapshot/S/B:d/F>nul
setmdir/m/r:d:\winboot>nul
net start>nul
net logon/savepw:no/y
net use F:\\AGILES\SBS>nul
net use G:\\AGILES\rplmacs>nul
PATH=F:\;F:\COMMAND
IF EXIST G:\XXAGLEXX.SET CALL G:\UPDATE.BAT XXAGLEXX
setmdir/m/r:g:\XXAGLEXX>nul
win.com
REG.TXT

[HKEY_LOCAL_MACHINE\SOFTWARE\Microsoft\Windows\Current
Version] "Registered Owner"="XXAGLEXX""Registered
Organization"="XXAGLEXX
Company""ConfiguPath"="G:\\XXAGLEXX\\config""SystemRoot"=
"G:\\XXAGLEXX"[HKEY_LOCAL_MACHINE\SOFTWARE\Microsoft\Wind
ows\Current Version\Setup]
"MachineDir"="G:\\XXAGLEXX"
"WinAdminDir"="G:\\XXAGLEXX"
"SetupScratchDir"="G:\\XXAGLEXX"
"ConfigPath"="G:\\XXAGLEXX\\config"
[HKEY_LOCAL_MACHINE\System\CurrentControlSet\Services\VxD
\VNETSUP]
"ComputerName"="XXAGLEXX"
"Comment"="XXAGLEXX"
[HKEY_LOCAL_MACHINE\System\CurrentControlSet\control\Comp -continued

```
uterName\
ComputerName]
"ComputerName"="XXAGLEXX"
[HKEY_LOCAL_MACHINE\Network\Logon]
"username"="XXAGLEXX"
[HKEY_LOCAL_MACHINE\TempKey\Software\Microsoft\Windows\Cu
rrentVersion\
Setup]
"BootDir"="G:\\XXAGLEXX"
"BootHost"="G:\\XXAGLEXX"
"OldWinBootDir"="G:\\XXAGLEXX\\WINBOOT"
"WinDir"="G:\\XXAGLEXX"
"AppsDir"="\\\\AGILES\\SBS\\"
"HostWinBootDir"="G:\\XXAGLEXX\\SUBOOT"
[HKEY_LOCAL_MACHINE\TempKey\System\CurrentControlSet\Serv
ices\VxD\
VNETSUP]
"ComputerName"="XXAGLEXX"
"Comment"="XXAGLEXX"
[HKEY_LOCAL_MACHINE\TempKey\System\CurrentControlSet\Cont
rol\
ComputerName\ComputerName]
"ComputerName"="XXAGLEXX"
[HKEY_USERS\Default\Software\Microsoft\Windows\CurrentVer
sion\GrpConv\Groups]
"G:\\XXAGLEXX\\PROGRAMS.GRP"=hex:00,61,4c,15
"G:\\XXAGLEXX\\ACCESSOR.GRP"=hex:00,61,4c,15
"G:\\XXAGLEXX\\DESKTOP.GRP"=hex:00,61,4c,15
"G:\\XXAGLEXX\\SYSTEMTO.GRP"=hex:00,61,4c,15
"G:\\XXAGLEXX\\DOCUMENT.GRP"=hex:00,61,4c,15
"G:\\XXAGLEXX\\GAMES.GRP"=hex:00,61,4c,15
"G:\\XXAGLEXX\\MAIN.GRP"=hex:00,61,4c,15
"G:\\XXAGLEXX\\program.ini"=hex:00,61,4c,15
[HKEY_USERS\Default\Software\Microsoft\Windows\CurrentVer
sion\Explorer\
ShellFolders]
"Desktop"="G:\\XXAGLEXX\\Desktop"
"Programs"="G:\\XXAGLEXX\\Start Menu\\Programs"
"Start Menu"="G:\\XXAGLEXX\\Start Menu"
"Startup"="G:\\XXAGLEXX\\Start Menu\\Programs\\StartUp"
"Recent"="G:\\XXAGLEXX\\Recent"
"SendTo"="G:\\XXAGLEXX\\SendTo"
```

Following block 112, the process then proceeds to block 114, which depicts network administration software 32 modifying the remote program load (RPL) records in RPL database 36 to associate the new client's name with the ID of the new client's LAN interface adapter 62. The process proceeds from block 114 to block 115, which illustrates server 16 prompting the user, via video display 72 of client 14, to enter the user's logon information (e.g., user ID and password). The user authentication module of network administration software 32 uses the user's logon information to authenticate the identity of the user. After the user has been authenticated, network administration software 32 constructs the Windows 95 run-time registry for new client 14 on server 16 utilizing the REG.TXT file in the new client's client database 44, as illustrated at block 116. In a preferred embodiment, the Windows 95 run-time registry is constructed by invoking the Windows "regedit" utility with the SYSTEM.DAT file as a first input and the REG.TXT file as a second input in place of a USER.DAT file. Further information on registry creation may be found, for example, in "Inside the Windows 95 Registry," O'Reilly and Assoc., August 1996, and Steven B. Thomas, "Windows NT 4.0 Registry: A Professional Reference," McGraw-Hill, which are both incorporated herein by reference. Finally, as shown at block 118, shared client OS 40 (i.e., Windows 95) is booted on the new client 14 through a RPL by reference to RPL database 36. As a result, As a result, the user of new client 14 is presented with his or her personalized Windows 95 desktop, including icons representing the client applications 42 specified by the user preferences stored in the user's directory 46. Thereafter, the process passes to block 120 and terminates. Thus, from a user perspective, a user is able to begin productive computing by simply obtaining a client computer 14 (which may be a replacement of a failed computer) preloaded with DOS or another cold boot OS, attaching LAN interface adapter 62 to communications link 64, powering on client computer 14, and logging on LAN 12.

Figure 4:
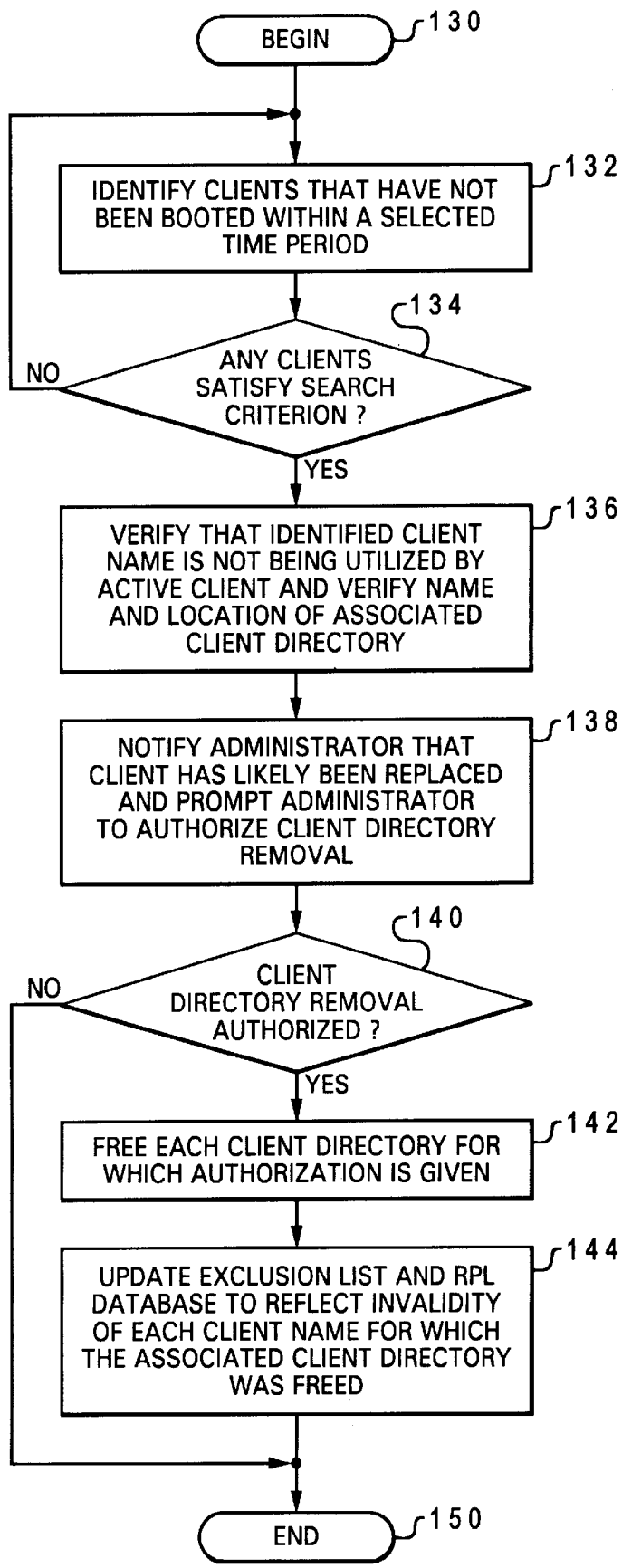
FIG. 4 is a high level logical flowchart illustrating an exemplary embodiment of a method for managing client directories residing on the server of a computer network.

Referring now to FIG. 4, there is depicted a high level logical flowchart of a method for managing client directories 44 on server 16 in accordance with the present invention. The method shown in FIG. 4 enables network administration software 32 to manage the amount of non-volatile storage consumed by client directories 44 by removing client directories 44 associated with replaced clients 14. As illustrated, the process begins at block 130 and then proceeds to block 132, which illustrates network administration software 32 invoking a utility that identifies all client by name that have not been booted within a selected time period, for example, the last 30 days. If no clients are identified that satisfy the time period selected as a search criterion, the process returns to block 132, and a search is again performed after an appropriate interval (e.g., at least one or two days). If, however, at least one client name is identified, network administration software 32 considers the identified client as a computer that has possibly been replaced, for example, due to a hardware fault. The process then proceeds to block 136, which depicts network administration software 32 verifying that the client name is not being utilized by any client 14 logged onto LAN 12 and verifying the name and location of the client directory 44 associated with the identified client name.

Following block 136, the process proceeds to block 138. Block 138 depicts network administration software notifying a human network administrator that the client computer associated with each identified client name has likely been replaced and prompting the network administrator to authorize the removal of the client directories associated with the identified client names. For each client name for which the network administrator gives authorization, the associated client directory 44 is freed, as depicted at block 142. If no authorization is given, the process simply terminates at block 150. After freeing client directories at block 142, network administration software 32 updates exclusion list 34 and RPL database 36 to remove each client name for which the associated client directory 44 was freed. Thereafter, the process terminates at block 150.

As has been described, the present invention provides an improved method and apparatus for introducing a client computer into a computer network. According to the present invention, from the user's perspective the introduction of a client into a network is a simple matter of attaching the client to the network and powering the client on. At power on, the client boots under a cold boot OS resident on the client that permits preliminary communication between the client and a server. The server is then responsible for loading shared operating system and application software onto the client and building the necessary run-time registries and configuration files, which the server accomplishes by reference to both client (i.e., hardware) and user (i.e., software) preferences stored on the server.

While the invention has been particularly shown and described with reference to a preferred embodiment, it will be understood by those skilled in the art that various changes in form and detail may be made therein without departing from the spirit and scope of the invention. For example, although network administration software in accordance with the present invention has been described with respect to a fully functional network environment, it should be understood that such software may alternatively be implemented as a program product that can be distributed encoded within a variety of media, including without limitation recordable media like floppy and optical disks and transmission media like computer and telephone networks.

What is claimed is:

1. A server for a computer network, that supports a plurality of clients, said server comprising:
    data storage that stores:
        network administration software and a shared client operating system, wherein said network administration software, in response to detection of a client attached to the computer network that has not previously been attached, boots said shared client operating system on said client; and
        a plurality of client directories that are each associated with a respective one of the plurality of clients, each of said plurality of client directories containing one or more files utilized to boot said shared client operating system on an associated client, said one or more files including at least one data file utilized to build a run-time registry for said shared client operating system; and
    execution resources capable of executing said network administration software.

2. The server of claim 1, said server further comprising a plurality of user directories that each store software preferences of a respective one of a plurality of users of said computer network.

3. The server of claim 2 said software preferences including a desktop configuration for said shared client operating system.

4. The server of claim 1, wherein said network administration software boots said shared client operating system on said client in response to obtaining user logon information, wherein said user logon information is the only user input required for said network administration software to boot said shared client operating system on said client.

5. A program product, comprising:
    a computer-usable medium; and
    network administration software encoded within said computer-usable medium, said network administration software including instruction means for creating a plurality of client directories on a server of the computer network, wherein said plurality of client directories are each associated with a respective one of a plurality of clients and each contains one or more files utilized to boot a shared client operating system on an associated client, said one or more files including at least one data file utilized to build a run-time registry for said shared client operating system, wherein, in response to detection of a client attached to a computer network that has not previously been attached to the computer network, said network administration software boots said shared client operating system on said client.

6. The program product of claim 5, said program product further comprising instruction means for establishing a plurality of user directories that each store software preferences of a respective one of a plurality of users of said computer network.

7. The program product of claim 6, said software preferences including a desktop configuration for said shared client operating system.

8. The program product of claim 5, wherein said network administration software boots said shared client operating system on said client in response to obtaining user logon information, wherein said user logon information is the only user input required for said network administration software to boot said shared client operating system on said client.

9. A computer network, comprising:
    a plurality of clients; and
    a server coupled to said plurality of clients, said server including:
        data storage that stores network administration software, a shared client operating system, and a plurality of client directories that are each associated with a respective one of said plurality of clients, each of said plurality of client directories containing one of more files utilized to boot said shared client operating system on an associated client, said one or more files including at least one data file utilized to build a run-time registry for said shared client operating system, wherein said network administration software, in response to detection of a new client attached to the computer network that has not previously been attached, boots said shared client operating system on said new client; and
        execution resources capable of executing said network administration software.

10. The server of claim 9, said server further comprising a plurality of user directories that each store software preferences of a respective one of a plurality of users of said computer network.

11. The server of claim 10, said software preferences including a desktop configuration for said shared client operating system.

12. The server of claim 9, wherein said network administration software boots said shared client operating system on said new client in response to obtaining user logon information, wherein said user logon information is the only user input required for said network administration software to boot said shared client operating system on said new client.

* * * * *